United States Patent
Harada

(10) Patent No.: US 7,546,518 B2
(45) Date of Patent: Jun. 9, 2009

(54) RECEIVED DATA COMPENSATING DEVICE

(75) Inventor: Hideki Harada, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 653 days.

(21) Appl. No.: 11/374,432

(22) Filed: Mar. 14, 2006

(65) Prior Publication Data

US 2006/0242472 A1     Oct. 26, 2006

(30) Foreign Application Priority Data

Mar. 31, 2005   (JP)   ............ 2005-105543

(51) Int. Cl.
*G06F 7/02* (2006.01)
(52) U.S. Cl. ............ 714/820; 714/49
(58) Field of Classification Search ............ 714/49, 714/820
See application file for complete search history.

(56) References Cited

U.S. PATENT DOCUMENTS

| | | | | |
|---|---|---|---|---|
| 3,956,589 A * | 5/1976 | Weathers et al. | ............ | 370/296 |
| 5,203,027 A | 4/1993 | Nounin et al. | | |
| 5,961,658 A * | 10/1999 | Reed et al. | ............ | 714/746 |
| 7,028,214 B2 * | 4/2006 | Takashi et al. | ............ | 714/5 |
| 7,191,083 B2 * | 3/2007 | Ashley et al. | ............ | 702/107 |
| 2003/0066020 A1 * | 4/2003 | Morita et al. | ............ | 714/794 |

FOREIGN PATENT DOCUMENTS

| | | |
|---|---|---|
| JP | 05-130151 | 5/1993 |
| JP | 2004-221905 | 8/2004 |

OTHER PUBLICATIONS

European Search Report.

* cited by examiner

*Primary Examiner*—Guy J Lamarre
(74) *Attorney, Agent, or Firm*—Foley & Lardner LLP

(57) ABSTRACT

Provided is a compensating device for a received data can be used in a wide application by a single apparatus for various wiring configurations and transmission media. The compensating device provided between a receiver circuit in a physical layer and a processing device utilizing the received data and including a plurality of preprocessing units provided in parallel with each other on an output side of the receiver circuit and each having a filtering function and a sampling function which have different characteristics from each other, a plurality of check units each provided in a next stage of the preprocessing unit and serving to execute a reliability check of the received data in accordance with a frame format of a protocol, a plurality of buffer units each provided in the next stage of the check unit and serving to store the data processed by the check unit, and a data selector for monitoring check results in the check units and selecting and outputting the data of the buffer units having a check result of OK.

12 Claims, 10 Drawing Sheets

Diagram showing structure of device according to the present invention (first embodiment)

Diagram showing structure of device according to the present invention (second embodiment)

Diagram showing structure of master unit (or slave unit) in which device according to the present invention is incorporated View showing more specific structure of PLC system including master unit and slave unit Fig. 8  Diagram showing structure of conventional device Diagram showing example of sampling circuit Diagram for explaining data recovery characteristic of sampling circuit

RECEIVED DATA COMPENSATING DEVICE

BACKGROUND OF THE INVENTION

1. Field of the Invention

The present invention relates to a received data compensating device provided between a receiving circuit constituting a physical layer and a processing device utilizing received data and having the function of recovering the received data.

2. Description of the Related Art

FIG. 8 shows a diagram showing a structure of a conventional received data compensating circuit. As shown in FIG. 8, a received data compensating device 100A is provided in a rear stage of a receiving IC 200 constituting a physical layer and comprises a preprocessing unit 1 and a check unit 2 in this example. The receiving IC 200 is mounted on a printed wiring board (PWB) and the received data compensating device 100A can be properly constituted by an ASIC, an FPGA or a microcomputer. An AD485 adapter for an analog device can also be used for the receiving IC 200.

In FIG. 8, a digital signal acquired through the receiving IC 200 from a communicating transmission line is transferred to the received data compensating device 100A. The preprocessing unit 1 has a filtering function and a sampling function. An example of the sampling circuit to be used herein is shown in FIG. 9. This circuit has already been disclosed by the applicant based on Japanese Patent Application Laid-Open No. 2004-221905.

As shown in FIG. 9, the sampling circuit comprises three D-type flip-flops DFF1 to DFF3 which are cascade connected to each other, a first selector SEL1 disposed in a rear stage of DFF1 to DFF3, a D-type flip-flop DFF4 disposed in a rear stage of SEL1, a second selector SEL2 disposed in a rear stage of DFF4, and a D-type flip-flop DFF5 disposed in a rear stage of SEL2. The sampling circuit serves to monitor the Q outputs of the D-type flip-flops DFF1 to DFF5 and to give switching signals S1 and S2 to the first and second selectors SEL1 and SEL2 based on the Q outputs, thereby restoring a digital signal including various noise components as shown in FIGs. 10A-10H.

The check unit 2 of FIG. 8 serves to check a reliability of data in a frame format of a protocol such as a CRC, a parity, a stop or a coding rule or to detect an error. Furthermore, the check unit 2 also carries out decoding in the case in which a transmission line is coded. Compensated and received data (CD) passing through the check unit 2 are transmitted to the data processing device together with a check result signal S1 and are thus utilized (refer to, for example, Japanese Patent Application Laid-Open No. Hei 5-130151).

In such a conventional received data compensating device, however, a filtering circuit included in the preprocessing unit 1 is fixed to have one characteristic. Accordingly, such a PLC can be difficult to use in connecting a master unit to a slave unit.

More specifically, in the PLC system of this type, various wiring configurations such as a digichain, a multidrop, a branch and a start are mixed on a communicating path thereof. In addition, various transmission media (electric cables and connectors having different characteristics) are used. Consequently, a reflecting and damping state of a signal in a transmission line is varied. In the case in which this signal is received by the filtering circuit fixed to have one characteristic, a communication wiring specification such as a wiring length and the number of connections is more reduced than that in the case in which the wiring configuration and the transfer medium correspond. In order to solve this problem by an enhancement in a wiring performance, it is necessary to prepare an IC (including one filtering circuit) and an apparatus to be provided in a plurality of formats for each cable and wiring configuration irrespective of the device having the same function. For this reason, costs for development and management are increased.

The present invention has been made by taking note of the conventional problems and has an object to provide a received data compensating device capable of carrying out a wide application through a single device for a transmission line including various wiring configurations and transmission media.

Other objects, functions and advantages of the present invention will be easily understood by the skilled in the art by referring to the following description of the specification.

SUMMARY OF THE INVENTION

In order to solve the problems described above, embodiments of the present invention employ a compensating device for received data. The compensating device is provided between a receiver circuit in a physical layer and a processing device utilizing the received data. The compensating device includes a plurality of preprocessing units provided in parallel with each other on an output side of the receiver circuit, each processing unit having a filtering function and a sampling function with different characteristics from each other. A plurality of check units may each be provided on an output side of each preprocessing unit and may serve to execute a reliability check of the data in accordance with a frame format of a protocol. A plurality of buffer units may each be provided on an output side of the check unit and serve to store the data processed by the check unit. Additionally, a data selector may be provided for monitoring a plurality of check results in the check units and selecting and outputting the data from the buffer units having a check result of OK.

According to such a structure, the received data obtained from the receiving circuit constituting the physical layer are processed at the same time by the preprocessing units which have different characteristics from each other having the filtering function and the sampling function. Also in the case in which the quality of the transmission line is varied, therefore, any of the preprocessing portions which are provided corresponds thereto so that an application to various transmission lines can be carried out by an apparatus having the same specification.

In a preferred embodiment, the data selector may select and output data in accordance with a preset priority when data of the buffer units are OK based on the check result in the check unit.

According to such a structure, also in the case in which excellent data are obtained in the buffers as a result of high quality of the transmission line or a simple wiring configuration, it is possible to reliably acquire correct data without delaying a selection.

In a preferred embodiment, moreover, it is also possible to further assemble a plurality of receiving condition counters each for counting OK and/or NG of the check result obtained from each of the check units, and the data selector may set priority based on a plurality of count values of the receiving condition counters.

According to such a structure, including the case in which an application to an optional transmission medium is carried out, a frequency of OK check results is particularly increased in an optimum processing system, selected from processing systems which are present through a trial period. In consideration of the information collected, therefore, it is also possible to automatically search for a more proper processing system.

In a preferred embodiment, the check unit may carry out the decode processing when the data are subjected to transmission line coding.

The received data compensating device according to embodiments of the present invention described above can be widely applied to a PLC system. More specifically, embodiments of the present invention can enhance the degree of a line adaptation by a disposition in the rear stage of the receiving circuit constituting the physical layer for each of a master unit, a slave unit, a repeater and the like which constitute the PLC system.

According to embodiments of the present invention, the received data obtained from the receiving circuit constituting the physical layer are processed simultaneously by the preprocessing units provided in parallel with each other on an output side thereof and having the filtering function and the sampling function which have different characteristics from each other. Irrespective of the quality and wiling configuration of the transmission line, therefore, it is possible to adapt transmission media and wiring configurations of various qualities by one receiving processing device through an adaptation of any of the processing systems to the characteristics. Thus, the usability of the receiving device of this type can be enhanced.

DETAILED DESCRIPTION OF THE PREFERRED EMBODIMENTS

Figure 1:
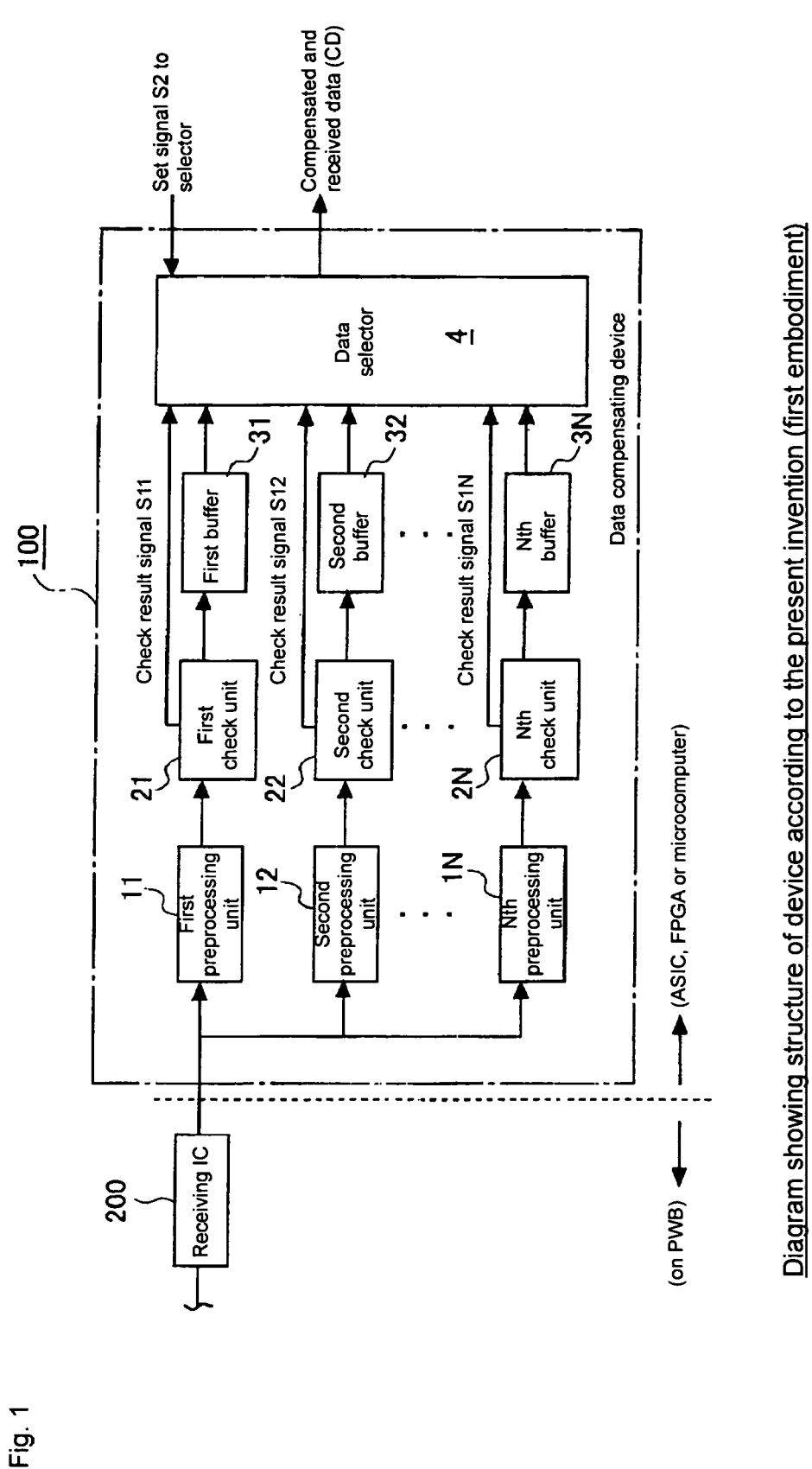
FIG. 1 shows a diagram showing a structure of a device according to a first embodiment of the present invention.

An embodiment of a received data compensating device according to the present invention will be described below in detail with reference to the accompanying drawings. FIG. 1 is a diagram showing a first embodiment of a structure of the device according to the present invention.

As shown in FIG. 1, a received data compensating device 100 is provided in a rear stage of a receiving IC 200 constituting a physical layer. It is possible to utilize the RS485 specification for the receiving IC 200, for example. More specifically, AD485 of analog devices and the like are suitable. In this example, the receiving IC 200 is mounted on a printed wiring board.

The received data compensating device 100 may include a plurality of preprocessing units 11, 12, . . . 1N provided in parallel with each other on the output side of the receiving IC 200 and having filtering functions having different characteristics from each other and sampling functions having different characteristics from each other. The received data compensating device 100 may also include a plurality of check units 21, 22, . . . 2N provided in the respective rear stages of the preprocessing units 11, 12, . . . 1N and serving to execute at least a reliability check of data in accordance with a frame format of a protocol. The received data compensating device 100 may additionally include a plurality of buffer units 31, 32, . . . 3N provided in the rear stages of the check units 21, 22, . . . 2N and serving to store data processed in the check units, and a data selector 4 for monitoring a check result in each of the check units 31, 32, . . . 3N and selecting and outputting the data of the buffer unit having a check result of OK.

Figure 9:
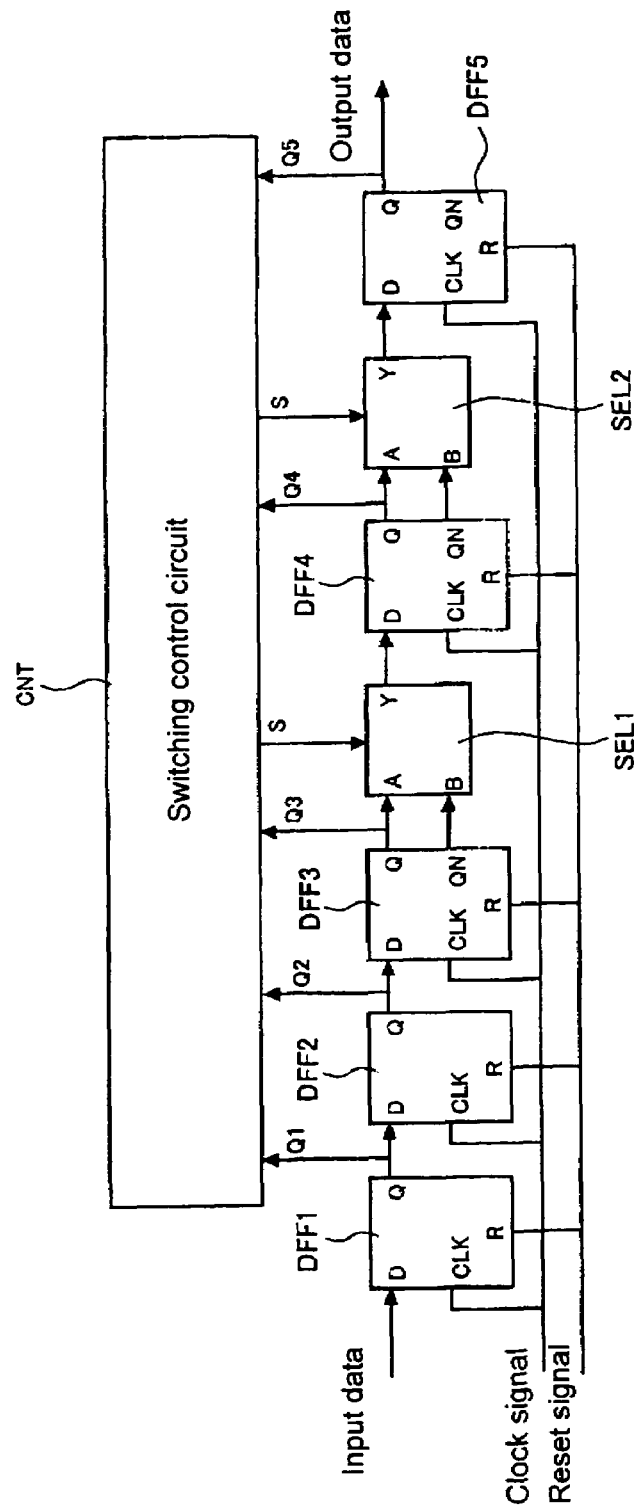
FIG. 9 shows a diagram showing an example of a sampling circuit.
Figure 10A:
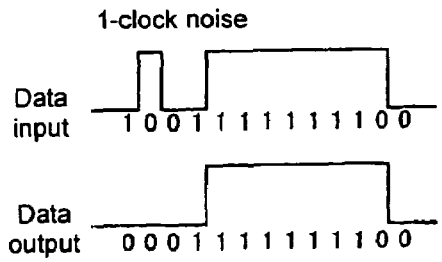
FIGS. 10A-10H show a diagrams for explaining a data recovery characteristic of the sampling circuit.
Figure 10E:
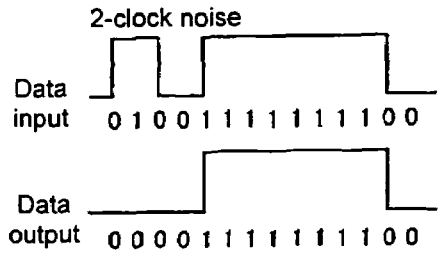
Figure 10B:
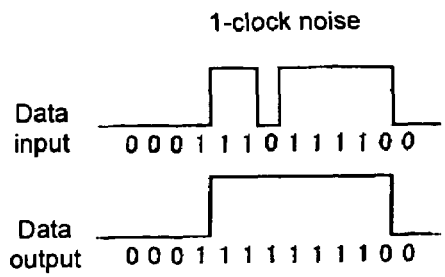
Figure 10F:
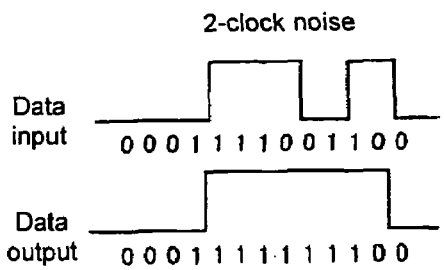
Figure 10C:
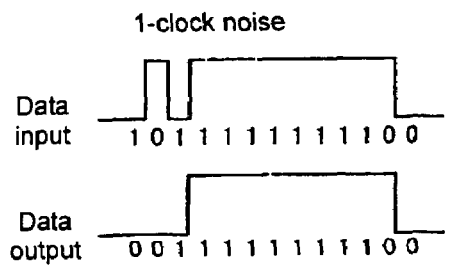
Figure 10G:
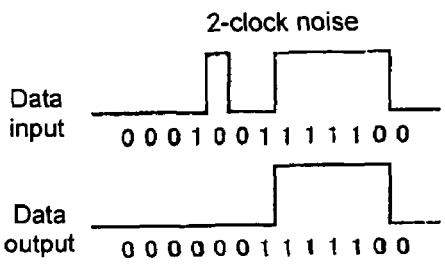
Figure 10D:
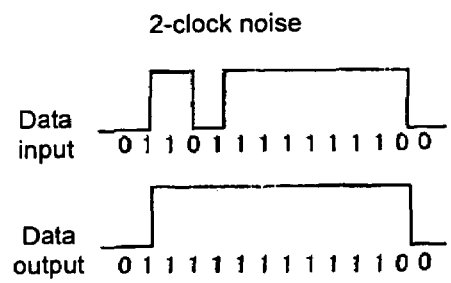
Figure 10H:
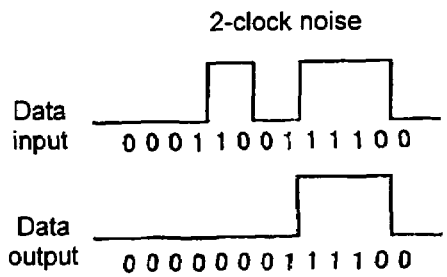

A digital signal acquired from a communicating transmission line through the receiving IC 200 is then transferred to the N preprocessing units 11, 12, . . . 1N provided in parallel with each other on the output side of the receiving IC 200. A filter circuit for implementing the filtering function included in the preprocessing units 11, 12, . . . 1N is almost identical to that described with reference to FIGs. 9 and 10. Data processed by the first preprocessing unit 11, the second preprocessing unit 12, . . . the Nth preprocessing unit 1N are transmitted to the first check unit 21, the second check unit 22, . . . the Nth check unit 2N which are disposed on an output side of each preprocessing unit. In these check units 21, 22, . . . 2N, a start detection, a reliability check of data in accordance with a frame format of a protocol, for example, a CRC, a parity, a stop, a code rule or the like, or a detection of a data error is carried out. In addition, decoding is also carried out when the transmission line coding is performed.

The data processed in each of the first check unit 21, the second check unit 22, . . . the Nth check unit 2N are then transferred to the first buffer 31, the second buffer 32, . . . the Nth buffer 3N disposed in the respective rear stages and are once stored therein.

Subsequently, any of data stored in the respective first buffer 31, the second buffer 32, . . . the Nth buffer 3N which are to be used are selected by means of the data selector, and are transmitted to a processing circuit (not shown) using the data.

The data selector 4 monitors the check results (check result signals S11, S12, . . . S1N) obtained after the filtering operations having different characteristics from each other and selects to transfer, to the rear stage, any of the buffers by which data are buffered. Buffer selection is based on the check results. Data having one check result of OK may be selected and any data having a plurality of check results of OK may be used.

If a plurality of check results is OK, it is also possible to give a priority to data of the filters 1 to N, thereby selecting and using data having a higher order. It is also possible to select any of the data stored in the buffer. The data selector 4 can also start to use data by only a start check.

In the case in which transmission line coding such as Manchester, xByB or an n-time continuous inverting insertion is carried out, a coding rule check in accordance with the transmission line coding may be performed in the check units 21, 22, . . . 2N and the number of times at which the check is to be carried out to start the use of the data may be predetermined, thereby starting the use of the data.

In the case in which the data are to be started for use in the start check and the coding rule check, it is not necessary to once stack all the data of one frame in the buffer. In the case in which a waveform shaping device such as a repeater transmits the data to next media, therefore, it is possible to send one frame of a CRC, a parity, a stop or the like with a smaller delay than that in a check to be carried out up to an end. Also in a network using the waveform shaping device such as a repeater, consequently, it is possible to enhance the reliability of the data without delaying a data transmitting time.

It is also possible to set the priority of data to be employed for the data selector through a control circuit or an external microcomputer, to receive and test a frame, to monitor a check result and to set to employ data of a filter having the highest reliability.

In case of the priority setting type, it is also possible to use an optimum circuit while stopping the supply of a clock from the filter to the buffer circuit which are not set to reduce a current consumed by a mounted IC. By switching one filter circuit together with the clock supply stopping function during the setting of the priority, moreover, it is also possible to implement an equivalent consumed current to that in the filter to one buffer circuit. (In operation, the circuits arranged in parallel are stopped. Therefore, the operation is similar to that in one circuit as in the conventional art).

In the case in which the transmission line coding check is carried out and the data are used before checking the rearmost portion of the frame, data in a high order are used if the receipt of a plurality of circuits is established. In the case in which the data to be transmitted through a filter in a high order cause a check error, however, it is also possible to continuously carry out the receipt by performing switching into the data of the filter established to be received in a low order in the middle of serial data.

Figure 2:
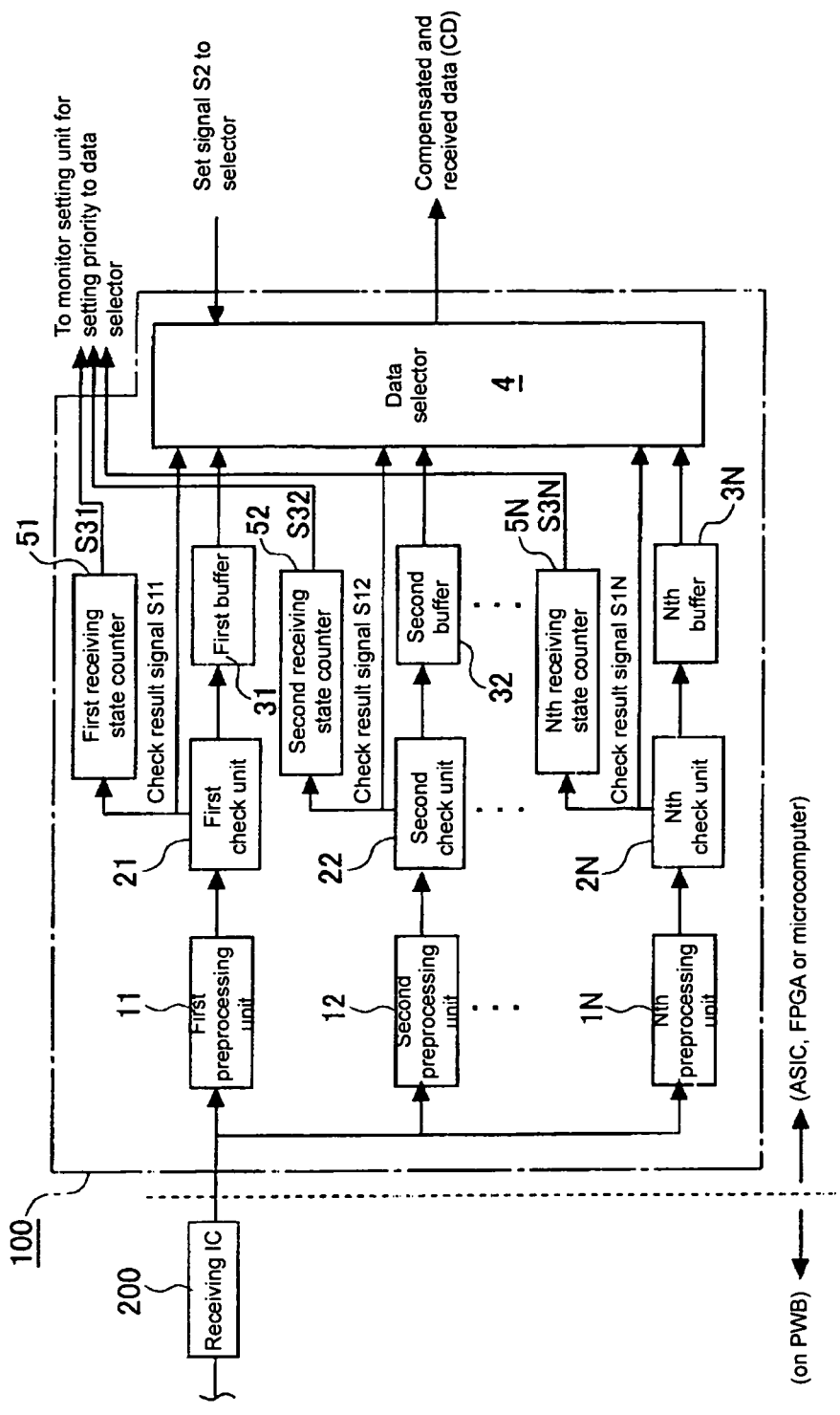
FIG. 2 shows a diagram showing the structure of the device according to a second embodiment of the present invention.

FIG. 2 shows a diagram showing a second embodiment of a structure of the device according to the present invention. FIG. 2 differs from FIG. 1 in that receiving state counters 51, 52, . . . 5N for counting receiving state signals (abnormal or normal) generated from the first check unit 21, the second check unit 22, . . . the Nth check unit 2N respectively are provided. Additionally, count signals S31, S32, . . . S3N obtained from their counters are sent to a monitor setting unit for setting a priority to the data selector, and the priority in the data selector is reset based on count results.

The received data compensating device 100 according to embodiments of the present invention can be incorporated into various receiving apparatuses constituting the PLC system.

Figure 3:
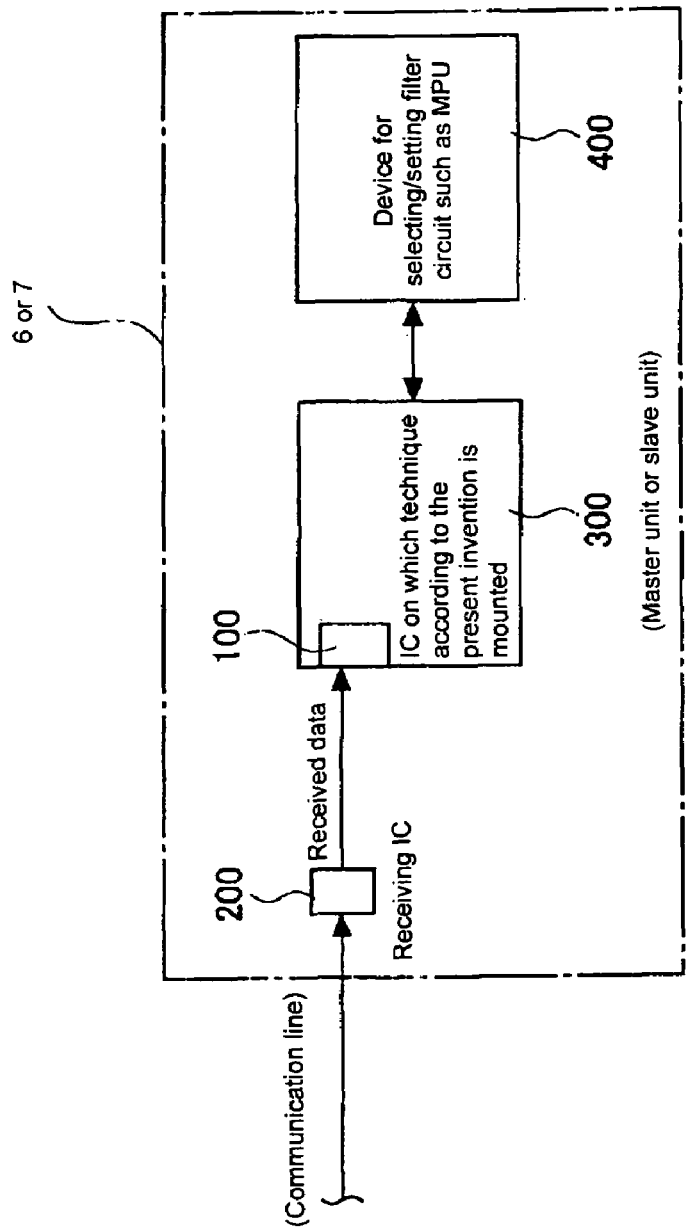
FIG. 3 shows a diagram showing a structure of a master unit (or a slave unit) in which the device according to the present invention is incorporated.

FIG. 3 shows a diagram showing a structure of a master unit (or a slave unit) in which the device according to embodiments of the present invention is incorporated. As shown FIG. 3, the received data compensating device 100 is incorporated in a master unit 6 or a slave unit 7. In more detail, the master unit 6 or the slave unit 7 includes a receiving IC 200 constituting a physical layer, an IC 300 for a master unit or a slave unit which processes the received data obtained from the receiving IC 200, and a device 400 for controlling the IC 300. The device 400 has the function of selecting or setting a filter circuit such as an MPU, and the IC 300 for implementing the function of the master or the slave is controlled by the device 400. The received data compensating device 100 according to embodiments of the present invention is incorporated in the input stage of the IC 300. The specific structure of the received data compensating device 100 which has been described with reference to FIGs. 1 and 2 can be used.

Figure 4:
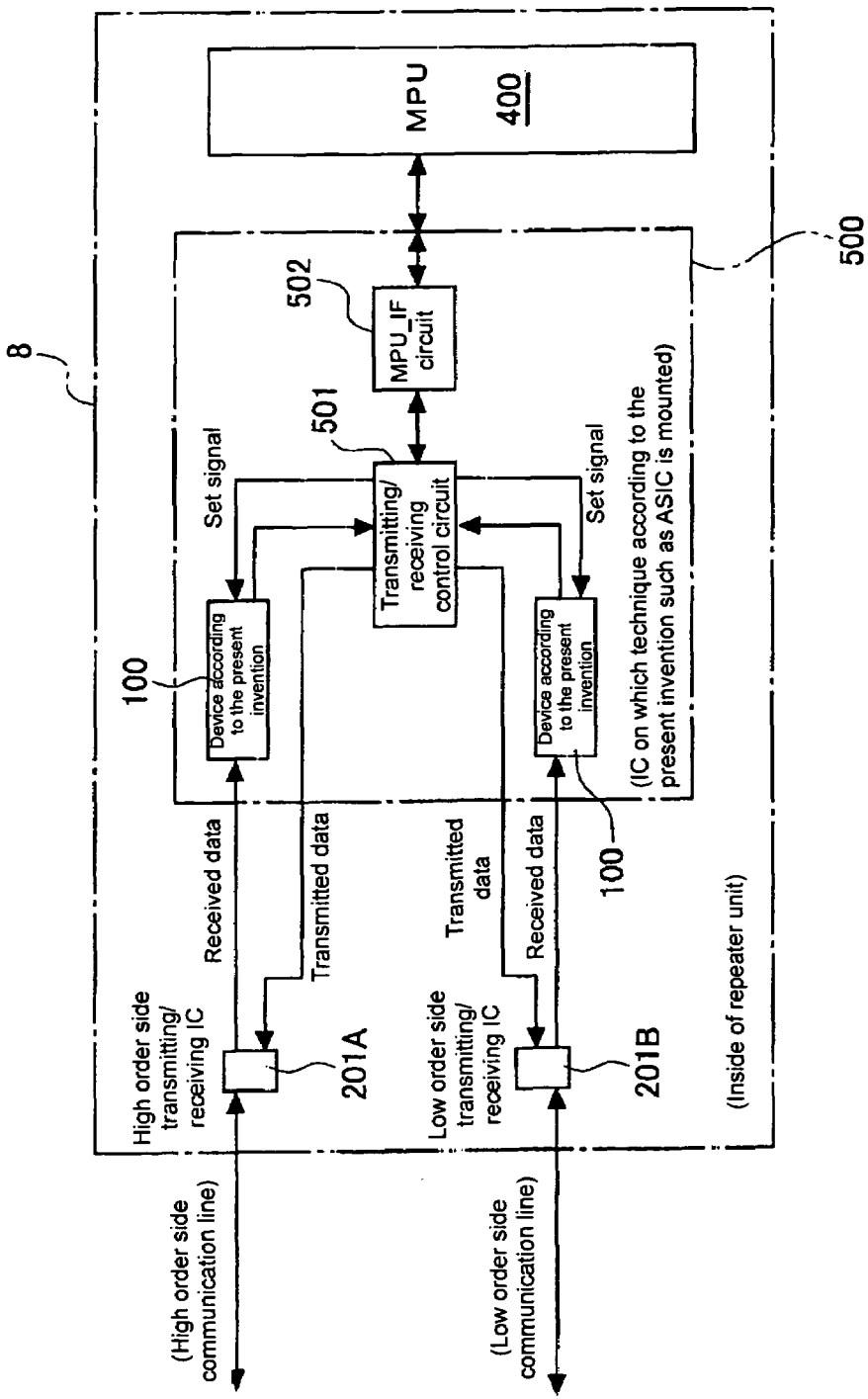
FIG. 4 shows a diagram showing a structure of a repeater in which the device according to the present invention is incorporated.

FIG. 4 shows a diagram showing a structure of a repeater in which the device according to the present invention is incorporated. In this example, a repeater 8 has a high order side transmitting and receiving IC 201A and a low order side transmitting and receiving IC 201B which function as physical layers, respectively. The ICs are connected to a high order side communication line and a low order side communication line.

A device 500 can be constituted by an IC on which the device according to embodiments of the present invention such as ASIC is mounted, and the device 100 is incorporated in the device 500 corresponding to the input stage of the received data, respectively. More specifically, the device 100 is provided in the input stage of the received data acquired from the high order side transmitting/receiving IC, and furthermore, is provided in the input stage of the received data acquired from the low order side transmitting/receiving IC 201B in the same manner. These two devices 100 according to embodiments of the present invention are controlled by a transmitting and receiving control circuit 501, and the transmitting and receiving control circuit 501 is controlled by the MPU 100 through an MPU interface circuit 502. By employing such a structure, it is possible to enhance a redundancy for the received data to carry out an application to various communicating media or wiring configurations while implementing the function of the repeater.

Figure 5:
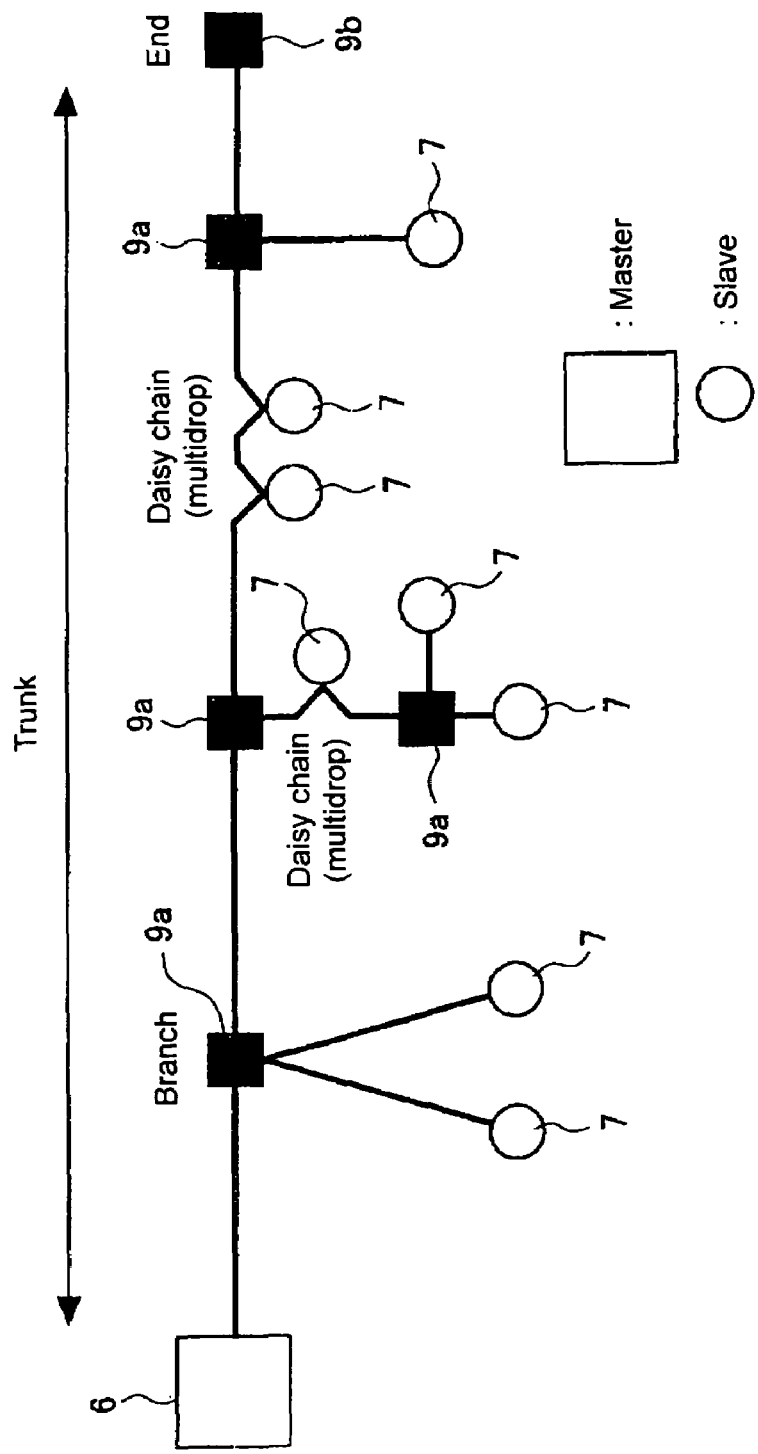
FIG. 5 shows a diagram showing an embodiment of a wiring system constituting a PLC system.

FIG. 5 shows a diagram showing a wiring system constituting a PLC system. In FIG. 5, reference numeral 6 denotes a master unit, reference numeral 7 denotes a slave unit, reference numeral 9a denotes a branch, and reference numeral 9b denotes a terminal resistor. Also in such a transmission line in order to mix the various wiring configurations and transmitting media, it is possible to carry out an application without changing any specifications irrespective of the transmitting media or the wiring configuration if the device 100 is incorporated in the master unit 6 and the slave unit 7, respectively.

Figure 6:
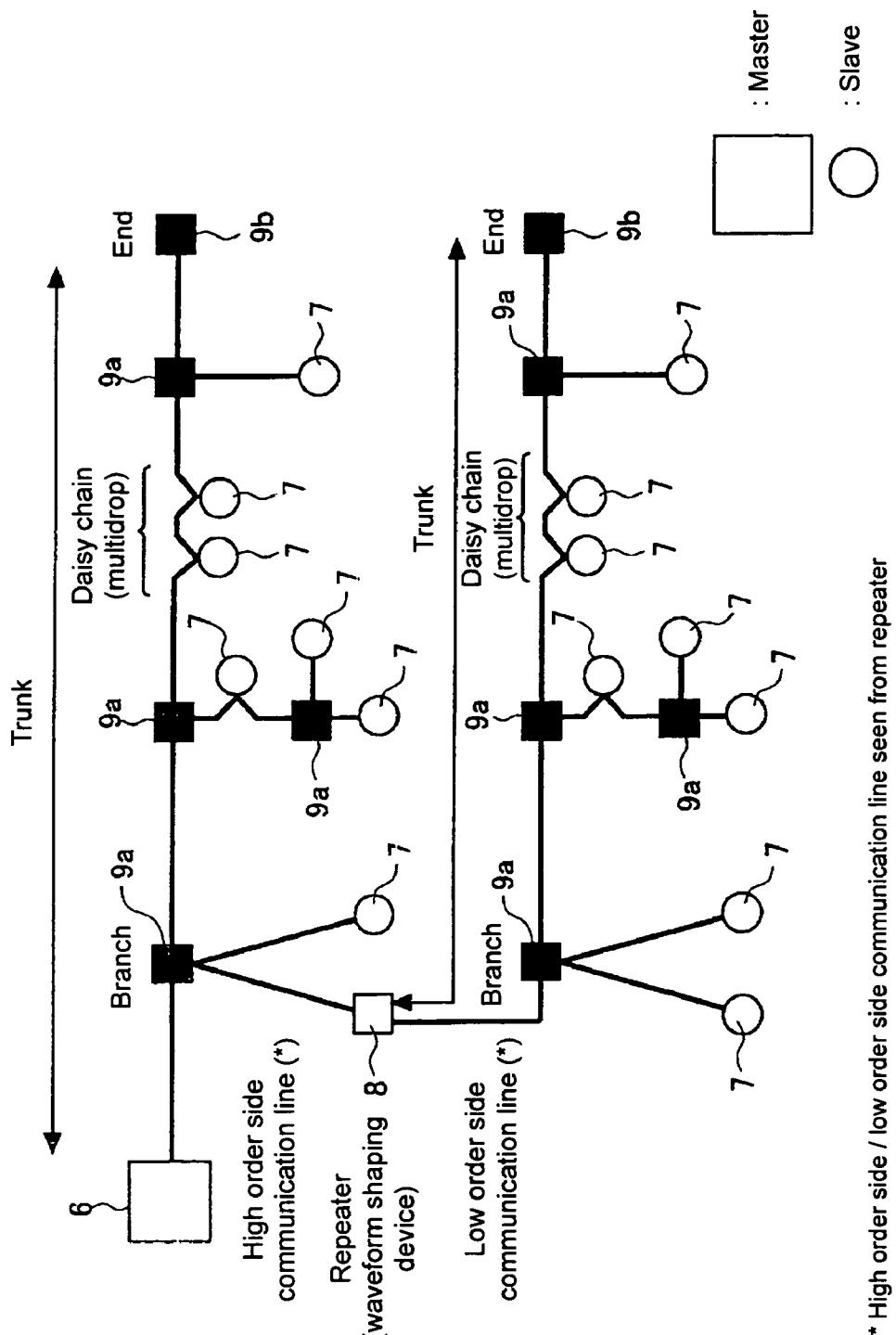
FIG. 6 shows a diagram showing an alternative embodiment of the wiring system constituting the PLC system.

FIG. 6 shows a diagram showing an alternative embodiment of a wiring system constituting the PLC system. In FIG. 6, reference numeral 6 denotes a master unit, reference numeral 7 denotes a slave unit, reference numeral 8 denotes a repeater, reference numeral 9a denotes a branch, and reference numeral 9b denotes a terminal resistor. Also in a communicating system including various transmitting media and wiring configurations, it is possible to enhance system adaptability by incorporating the device 100 in the repeater 8 in addition to the master unit 6 and the slave unit 7.

Figure 7:
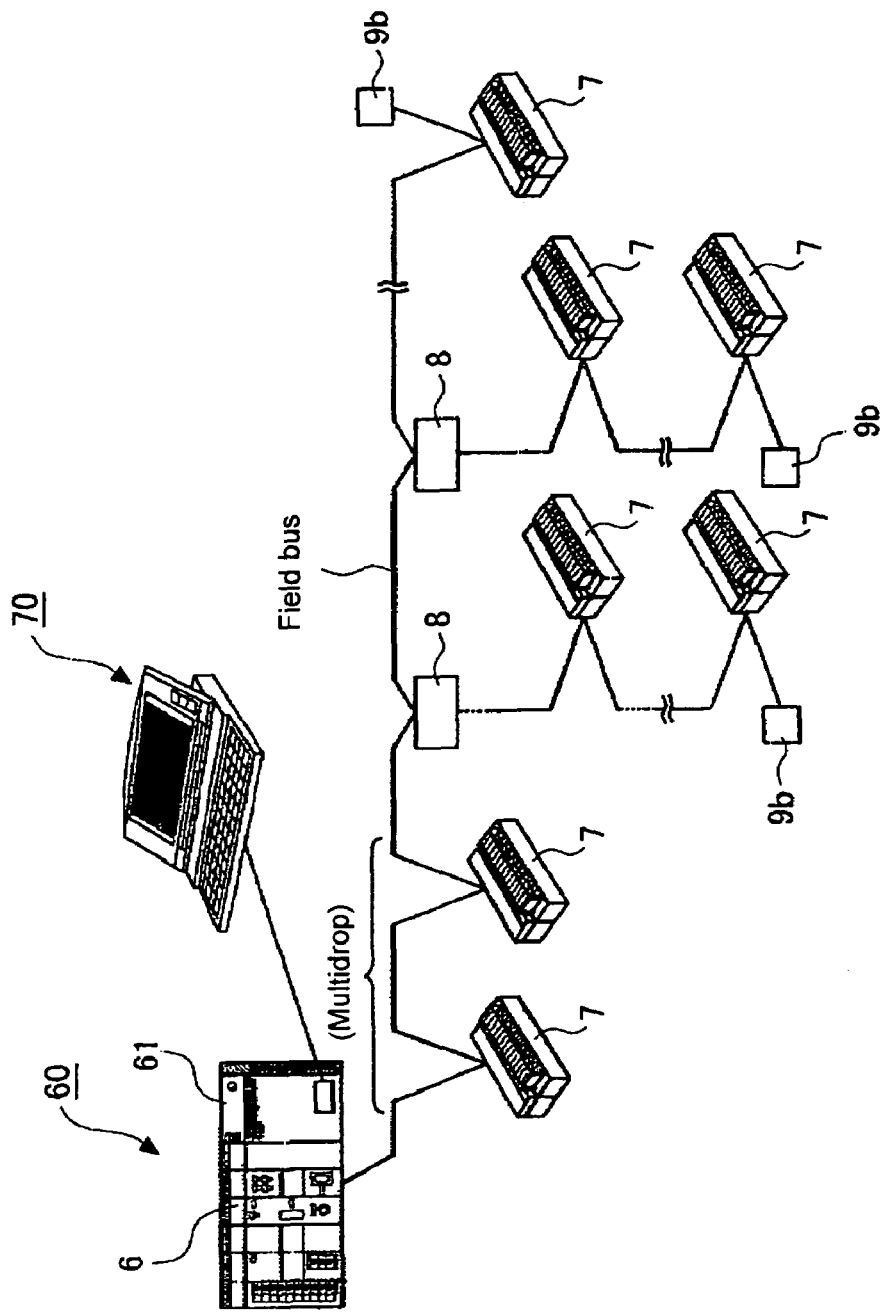
FIG. 7 shows a view showing a more specific structure of the PLC system including a master unit and a slave unit.
Figure 8:
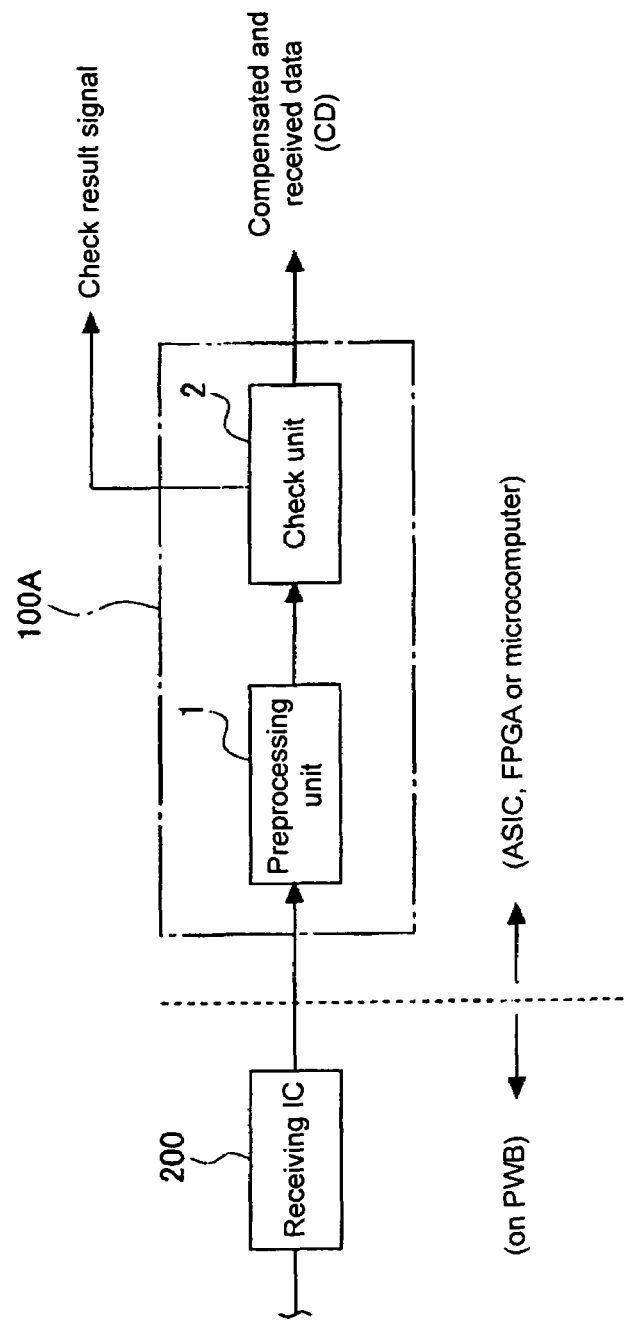
FIG. 8 shows a diagram showing a structure of a conventional device.

Finally, FIG. 7 shows a view showing a more specific structure of a PLC system including a master unit and a slave unit. In FIG. 7, reference numeral 70 denotes a personal computer, reference numeral 60 denotes a PLC, reference numeral 6 denotes a master unit, reference numeral 61 denotes a CPU unit, reference numeral 7 denotes a slave unit, reference numeral 8 denotes a repeater, and reference numeral 9b denotes a terminal resistor. Also in such a system including a complicated wiring configuration and a complicated transmission medium, it is possible to remarkably enhance versatility for a communicating path by incorporating the device 100 in the master unit 6, the slave unit 7 and the repeater 8.

As described above, according to embodiments of the present invention, the received data which are obtained from the receiving circuit constituting the physical layer are processed simultaneously by a plurality of preprocessing units provided in parallel with each other on the output side and having the filtering function and the sampling function which have different characteristics from each other. Also, in regardless of the transmission path quality and particular wiring configuration, therefore, any processing system is adapted to the same characteristic. By one receiving processing device, therefore, it is possible to adapt transmission media and wiring configurations of various qualities. Thus, it is possible to enhance usability of the receiving device of this type.

What is claimed is:

1. A compensating device for received data provided between a receiver circuit in a physical layer and a processing device utilizing the received data, comprising:
   a plurality of preprocessing units provided in parallel with each other on an output side of the receiver circuit, each preprocessing unit having a filtering function and a sampling function with different characteristics from each other preprocessing unit;
   a plurality of check units each provided in a next stage of the each of preprocessing units and serving to execute a reliability check of the data in accordance with a frame format of a protocol;
   a plurality of buffer units each provided in a next stage of the check unit, each buffer unit serving to store the data processed by corresponding check unit; and
   a data selector for monitoring a plurality of check results in the check units and selecting and outputting the data from the buffer units having a check result of OK.

2. The compensating device of claim 1, wherein the data selector selects and outputs data in accordance with a preset priority when multiple check results are OK.

3. The compensating device of claim 2, further comprising a plurality of receiving condition counters each for counting each OK or NG check result obtained from each of the check units,
   wherein the data selector sets the priority based on a plurality of count values of the receiving condition counters.

4. A communication master unit of a programmable controller having a compensating device for received data at an output side, the compensating device comprising:
   a plurality of preprocessing units provided in parallel with each other on an output side of the receiver circuit each preprocessing unit having a filtering function and a sampling function with different characteristics from each other;
   a plurality of check units each provided on an output side of the preprocessing unit and serving to execute a reliability check of the data in accordance with a frame format of a protocol;
   a plurality of buffer units each provided on an output side of the check unit and serving to store the data processed by the check unit; and
   a data selector for monitoring a plurality of check results in the check units and selecting and outputting data from the buffer units having a check result of OK.

5. The communication master unit of claim 4, wherein the data selector selects and outputs data in accordance with a preset priority when multiple check results are judged OK by the check units.

6. The communication master unit of claim 5, further comprising a plurality of receiving condition counters each for counting OK or NG of the check result obtained from each of the check units,
   wherein the data selector sets the priority based on a plurality of count values of the receiving condition counters.

7. A slave unit of a programmable controller having a compensating device for received data on an output side of a receiver circuit in a physical layer, the compensating device comprising:
   a plurality of preprocessing units provided in parallel with each other on an output side of the receiver circuit each preprocessing unit having a filtering function and a sampling function with different characteristics from each other;
   a plurality of check units each provided on an output side of the preprocessing unit and serving to execute a reliability check of the data in accordance with a frame format of a protocol;
   a plurality of buffer units each provided on an output side of the check unit and serving to store the data processed by the check unit; and
   a data selector for monitoring a plurality of check results in the check units and selecting and outputting data from the buffer units having a check result of OK.

8. The slave unit of claim 7, wherein the data selector selects and outputs data in accordance with a preset priority when multiple check results are judged OK by the check units.

9. The slave unit of claim 8, further comprising a plurality of receiving condition counters each for counting OK or NG of the check result obtained from each of the check units,
   wherein the data selector sets the priority based on a plurality of count values of the receiving condition counters.

10. A repeater to be connected to an upper side communication line and/or a lower side communication line having a compensating device for a received data on an output side of a receiver circuit in a physical layer for each line, the compensating device comprising;
    a plurality of preprocessing units provided in parallel with each other on an output side of the receiver circuit each preprocessing unit having a filtering function and a sampling function with different characteristics from each other;
    a plurality of check units each provided on an output side of the preprocessing unit and serving to execute a reliability check of the data in accordance with a frame format of a protocol;
    a plurality of buffer units each provided on an output side of the check unit and serving to store the data processed by the check unit; and
    a data selector for monitoring a plurality of check results in the check units and selecting and outputting data from the buffer units having a check result of OK.

11. The repeater of claim 10, wherein the data selector selects and outputs data in accordance with a preset priority when multiple check results are judged OK by the check units.

12. The repeater of claim 11, further comprising a plurality of receiving condition counters each for counting OK or NG of the check result obtained from each of the check units,
    wherein the data selector sets the priority based on a plurality of count values of the receiving condition counters.

* * * * *